(12) United States Patent
Nielsen et al.

(10) Patent No.: US 6,219,179 B1
(45) Date of Patent: Apr. 17, 2001

(54) BEAM SPLITTER DEVICE

(75) Inventors: Tim Nielsen, Bielefeld; Peter Andresen, Dransfeld, both of (DE)

(73) Assignee: Lavision GmbH (DE)

( * ) Notice: Subject to any disclaimer, the term of this patent is extended or adjusted under 35 U.S.C. 154(b) by 0 days.

(21) Appl. No.: 09/492,641

(22) Filed: Jan. 27, 2000

(30) Foreign Application Priority Data

Feb. 5, 1999 (DE) .............................. 199 04 592

(51) Int. Cl.$^7$ .............................. G02B 21/06; G02B 5/30; G02B 27/14
(52) U.S. Cl. .......................... 359/386; 359/368; 359/385; 359/495; 359/636
(58) Field of Search ............................ 359/368, 372–373, 359/385–390, 583, 589, 618, 625, 634–640, 831–837, 495

(56) References Cited

U.S. PATENT DOCUMENTS

| | | | | |
|---|---|---|---|---|
| 2,267,948 | * | 12/1941 | Rantsch | 359/636 |
| 2,359,694 | * | 10/1944 | Turner | 359/386 |
| 3,449,039 | * | 6/1969 | Hoffman, Jr. | 359/495 |
| 4,745,591 | * | 5/1988 | Foley | 359/495 |
| 4,997,261 | * | 3/1991 | Taniura | 359/495 |
| 5,165,080 | * | 11/1992 | Healey | 359/636 |

FOREIGN PATENT DOCUMENTS

| | | |
|---|---|---|
| 3876344 | 3/1989 | (DE) . |
| 3918412 | 2/1990 | (DE) . |
| 195 35 525 | 3/1997 | (DE) . |
| 196 53 413 | 6/1998 | (DE) . |
| 386643 | 9/1990 | (EP) . |

\* cited by examiner

*Primary Examiner*—Thong Nguyen
(74) *Attorney, Agent, or Firm*—Thoams R. Vigil

(57) ABSTRACT

The method for splitting and reflecting beams in a laser scanning microscope which produces a laser beam (1) comprises the steps of: reflecting a beam from a partially reflecting mirror (2); splitting the laser beam (1) with a splitting device into partial beams (5); causing the partial beams to travel in a plane; directing the partial beams to a sample under investigation; providing the partially reflecting mirror (2) with a constant transmission; placing the partially reflecting mirror between two high reflectivity mirrors (3,4); transmitting the laser beam (1) to one of the high reflectivity mirrors (3); reflecting said beam (1) to the other one of the high reflectivity mirrors (4) with basically equal attenuation; repeatedly transmitting the beam to one of the mirrors; and repeatedly reflecting the beam to the other one of said mirrors (4); arranging the partially reflecting mirror and the high reflectivity mirrors (3,4) relative to each other to cause beams (5) reflected by the partially reflecting mirror (2) not to coincide with beams reflected by said high-reflectivity mirrors (3,4); shifting forwardly, at an exit region of the splitting device, an edge of the partially reflecting mirror (2) along an edge of one of the high-reflective mirrors (4); and shifting rearwardly an edge of the other high-reflective mirror (3).

14 Claims, 3 Drawing Sheets

BEAM SPLITTER DEVICE

CROSS-REFERENCE TO RELATED APPLICATIONS

This application claims priority from German Application No. DE 199 04 592.5 filed Feb. 5, 1999

BACKGROUND OF THE INVENTION

1. Field of the Invention

The present invention deals with a beam splitting device in particular for a laser scanning microscope, comprising a laser producing a laser beam and a system of intentionally arranged partially and totally reflecting mirrors splitting the laser beam into multiple partial beams, whereby the partial beams leave the beam splitter device in a plane and are fed to the sample under investigation.

2. Description of the Prior Art

From the previous art (DE 196 53 413 A1) it is known that a multitude of partial beams can be produced by allowing an expanded laser beam to be incident on a micro-lens array.

This means in particular, that each partial beam is generated from a different spatial part of the beam profile of the incident beam. The partial beams are focused by the micro lenses according to their focal length in one or more closely spaced planes behind the micro lens array and propagate towards the microscope objective lens which focuses the partial beams onto the sample. Hereby the beams overilluminate the aperture of the microscope objective lens. The number and distance between the partial beams is dictated by the design of the micro-lens array.

Typically in these optical devices there is a bifurcation of the optical path between the light source for the laser beam and the sample in order to separate and direct the fluorescence originating from the sample towards a photodetector. A dichroic mirror is used to separate and direct the fluorescence light towards the photodetector.

A problem of the known beam splitter is that the individual partial beams have substantially different intensities. This is due to the fact that laser beams have a distribution of intensity across the beam cross-section. Lasers used in laser scanning microscopy typically have a gaussian beam profile. This means, the partial beams that are generated by a micro-lens array from the centre of the laser beam are more intense than those beams generated from the edge of the expanded beam. The detected signal is the fluorescence excited by the partial beams.

In the case of one photon excitation this signal is proportional to the intensity of the exciting partial beams. In non-linear microscopy (2, 3 or more photon excitation) this effect is squared or cubed respectively. For example for two beams differing a factor of 4 in intensity the signals generated by these beams differ by a factor of 4 (1 photon excitation), 16 (2 photon exc.) or 64 (3 photon exc.) . This example illustrates the problems when one uses micro-lens arrays for the generation of multiple partial beams especially in conjunction with non-linear laser scanning microscopy.

Another problem of the known microscope is that the resolution so obtained is not as good as allowed by the diffraction limit of the employed microscope objective lens.

Lateral resolution in laser scanning microscopy is given by the full width at half maximum of the focus generated in the sample. In the case of the known microscope the size of the focus is not only determined by the aperture of the employed microscope objective lens but also by shape and size of the micro lenses because the micro lenses act as the limiting diffracting aperture for every partial beam. This means in particular, that the resolution decreases with increasing number of beams because the size of the micro lenses is reduced and the diameter of the foci rises.

Furthermore, the micro lenses are not illuminated symmetrically and more so with outer part of the beam profile of an expanded laser beam generally decreasing towards the edge. As a consequence the foci have an asymmetric intensity distribution in the sample.

As resolution is one of the most important parameters in microscopy this is not an irrelevant problem.

Yet another problem of the beam splitter is that the energy of the incident laser beam is not used completely.

Part of the expanded laser beam is cut off by the edge of the micro lens array and by the edges of the individual micro lenses. These losses add up so that e.g. starting from 1.4 W output power of the laser only about 125 mW (9%) reach the sample (Jörg Bewersdorf, Rainer Pick, Stefan W. Hell, "Multifocal multiphoton microscopy", Optics Letters, Vol. 23, No. 9 (1998).)

The loss of laser power substantially reduces optical efficiency of the microscope because the required time for a measurement depends on the amount of laser power at the sample. This is especially of importance in non-linear microscope systems where the excitation efficiency depends nonlinear on the excitation intensity.

For biological applications of laser scanning microscopy where processes in living cells are studied the required time for a measurement is an important aspect because it determines the maximum speed with which the processes can be investigated. The study of the propagation of impulses in nerve cells is an example (R. Yuste, W. Denk, "Dendritic spines as basic functional units of neuronal integration", Nature Vol. 375, pp. 682–684 (1995).) Here laser scanning microscopy was required to obtain high-resolution images from deep layers of intact nervous tissue The slow imaging speed prevented the study of the propagation of impulses with two-dimensional spatial resolution. An enhancement in the imaging speed will lead to the further extension of laser scanning microscopy to faster processes.

Crucial for imaging speed is the laser power inside the sample. As the power of a single beam can not be increased arbitrarily without damaging the sample, the power inside the sample can only be raised substantially by illuminating several points using several beams simultaneously. Here the efficacy of the beam splitting method determines (for a fixed output power of the laser) the maximum number of partial beams.

Another problem of the known microscope is that distance and number of partial beams are fixed by the nature of the micro-lens array. Depending on the application, a smaller or larger distance between the beams is desirable.

Single cells can be studied with maximum speed if all beams are directed at the one cell under investigation. In this case a distance of approx. 2 μm between the beams is reasonable.

If microstructured substrates for the analysis of biochemical reactions ("biochips") are to be analysed, a distance on the order of the microstructure is desired(approx. 20 μm). The beam splitter of the known art does not offer the possibility of changing number and distance between beams.

In DE 39 18 412 A1, another beam splitting device for a laser scanning microscope is described comprising a laser producing a laser beam and a semi-transparent mirror dividing the said laser beam into partial beams, said partial beams leaving the beam splitting device in a plane and being guided to the sample under investigation.

In DE 195 35 525 A1 a beam splitter is described comprising a semi-transparent and a highly reflective layer, said semi-transparent layer being located in the optical path in front of said highly reflective layer and reflecting back to said highly reflective layer and having a transmission increasing with the number of reflections in order to get partial beams with equal intensity.

In EP 0 386 643 A2 a beam splitter is described comprising a semi-transparent and a highly reflective layer, said semi-transparent layer being in front of said highly reflective layer and in different embodiments being tilted or stepped and where in another embodiment two beam splitters tilted by 90 degrees with respect to each other are provided in order to generate a two-dimensional illumination array.

In DE 38 76 344 T2 an optical beam divider is described comprising a semi-transparent layer having a constant transmission and being located between to highly reflective layers, said layers being parallel to each other and said semi-transparent layer transmitting the incident light to one of said highly reflective layers and reflecting the light to the other one of said highly reflective layers with equal attenuation and again and repeatedly transmitting the light to one of said highly reflective mirrors and reflecting it to the other one of said highly reflective mirrors with equal attenuation.

SUMMARY OF THE INVENTION

The motive of the present invention is to build a beam splitter device for a laser scanning microscope allowing convenient control over number and distance between the partial beams.

In accordance with the present invention the beam splitter device comprises a partially reflecting mirror having a constant transmission, and being located between two high reflectivity mirrors, and reflecting the laser beam to one of said high reflectivity mirrors and transmitting it to the other one of said high reflectivity mirrors with equal attenuation, and again and repeatedly reflecting the laser beam to one of said high reflectivity mirrors and transmitting it to the other one of said high reflectivity mirrors with equal attenuation, and being placed at different distances from said high reflectivity mirrors and/or said high reflectivity mirrors being tilted with respect to said partially reflecting mirror causing beams reflected by said partially reflecting mirror not to overlap with beams reflected by said high reflectivity mirrors, and at the exit region of the device the edge of said partially reflecting mirror being shifted along the edge of one of said high-reflective mirrors and being shifted aback the edge of the other said high reflectivity mirror.

These and other objects, features, aspects and advantages of the present invention will become more apparent from the following detailed description of the present invention when considered in conjunction with the accompanying drawings.

The invented way to split the beams into partial beams has the following advantages:
1. the energy of the incident laser is used completely and split among the partial beams,
2. each partial beam has the same beam profile as the incident laser beam,
3. if the partially reflecting mirror splits the beam in a ratio of 1:1 all partial beams have the same intensity,
4. if the mirrors are parallel to each other the generated partial beams are also parallel to each other. If one or both high reflectivity mirrors are tilted with respect to the partially reflecting mirror the generated partial beams have an angle with each other. The angle of the partial beams determines the distance of the foci generated by the microscope objective lens in the sample, i.e. by tilting the high reflectivity mirrors the distance between the foci can be changed,
5. the distance of the partial beams at the exit of the beam splitter device is determined by the difference of the distances between the high reflectivity mirrors and the partially reflecting mirror.

In general, high energy efficiency of the beam splitter and equal intensities of the partial beams is very advantageous for laser scanning microscopy and leads to an increase in imaging speed. The possibility to change the distance between the foci provides the necessary flexibility to meet the requirements of the respective application.

DESCRIPTION OF PREFERRED EMBODIMENT(S)

Figure 1:
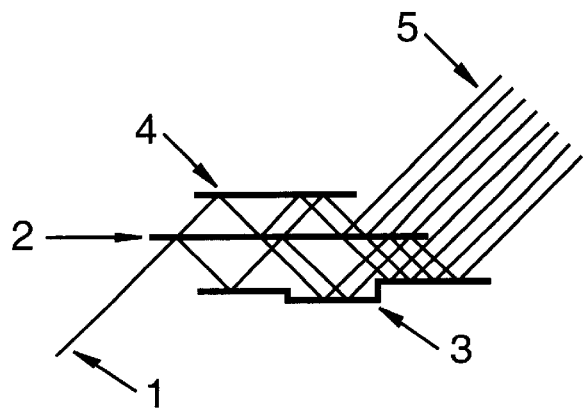
FIG. 1 shows an optical arrangement comprising two high reflectivity mirrors and a partially reflecting mirror located between the high reflectivity mirrors.

FIG. 1 shows a beam splitter constructed as an embodiment of the present invention generating 8 partial beams (5) from the incident beam (1). The partial beams (5) are located side by side on a line. The high reflectivity mirror (3) is furnished with a step, i.e. the distance of this mirror to the high reflectivity mirror (4) and to the partially reflecting mirror (2) respectively is variable through this step (3).

Figure 2:
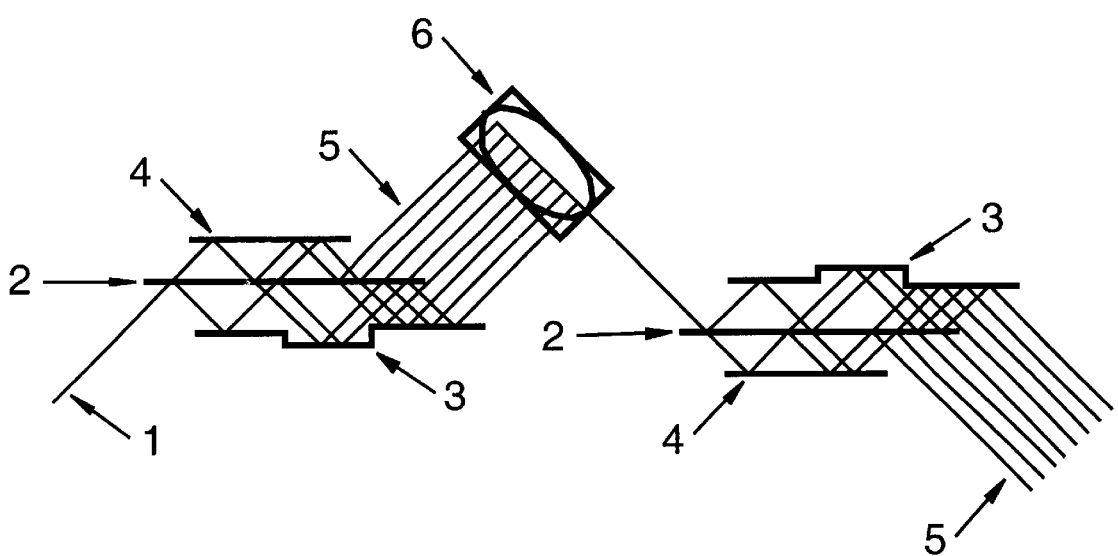
FIG. 2 shows a serial arrangement of two beam splitter devices with a periscope provided between both optical arrangements.

In the beam splitter according to FIG. 2 a periscope (6) is inserted between two optical arrangements splitting the laser beam. The partial beams (5) hit the periscope and are directed by the periscope towards the second optical arrangement to be split further. The second optical arrangement splits every partial beam into several partial beams (5) in such a way that a two-dimensional array of partial beams is generated. The same result can be achieved if both optical arrangements that split the laser beam are tilted with respect to each other in particular by an angle of 90 degrees.

Figure 3:
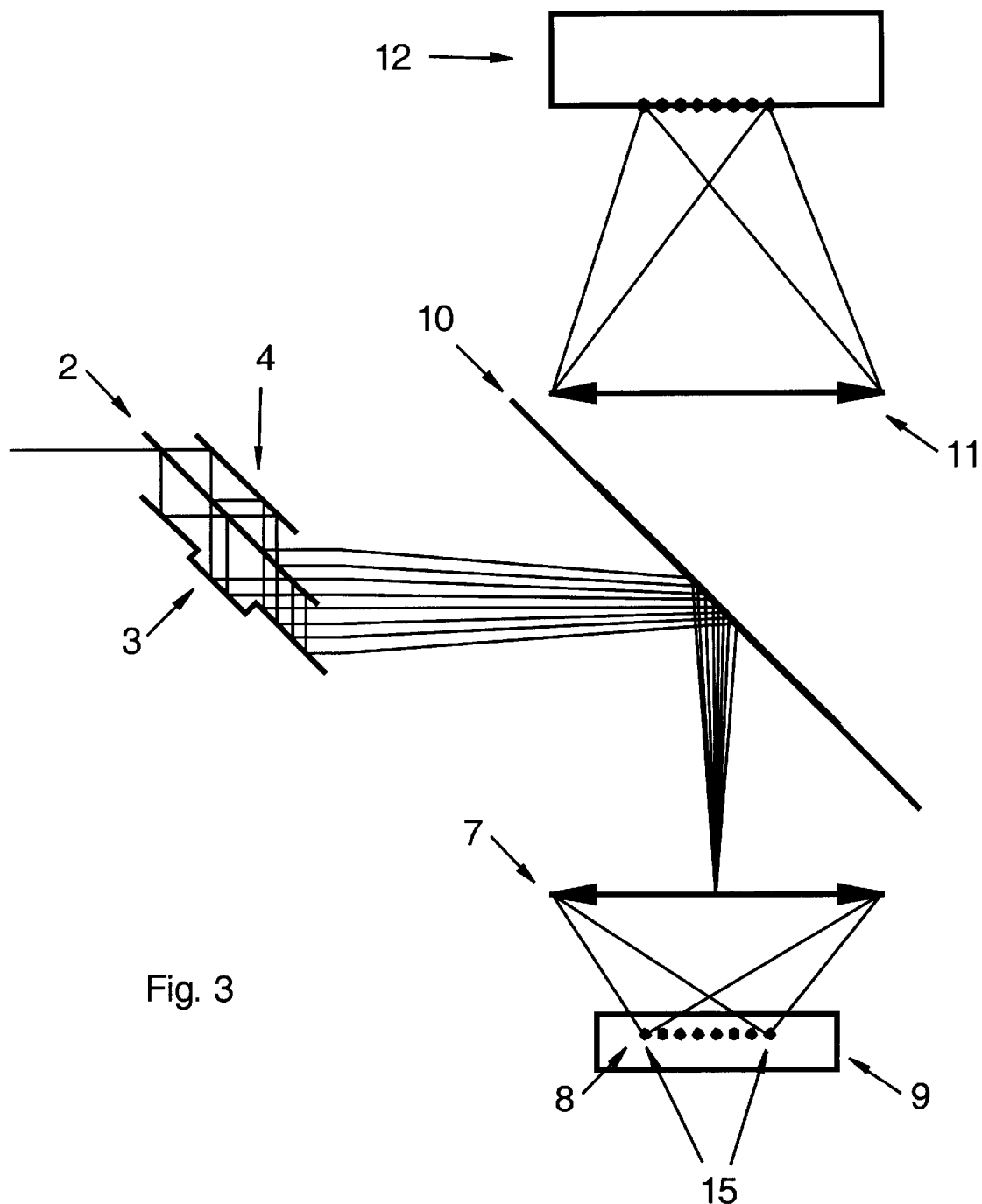
FIG. 3 shows a beam splitter in a laser scanning microscope.

FIG. 3 shows the integration of beam splitter with the optical path of laser scanning microscope. Here, there is a dichroic mirror (10) provided between the sample (9) and the photodetector (12). The dichroic mirror functions in such a way that the partial beams coming in from the beam splitter are directly reflected towards the sample and beams coming from the sample are transmitted to the photodetector (12) due to their different wavelengths. There is a tube lens (11) in front of the photodetector (12) as can be seen from FIG. 3.

Figure 4:
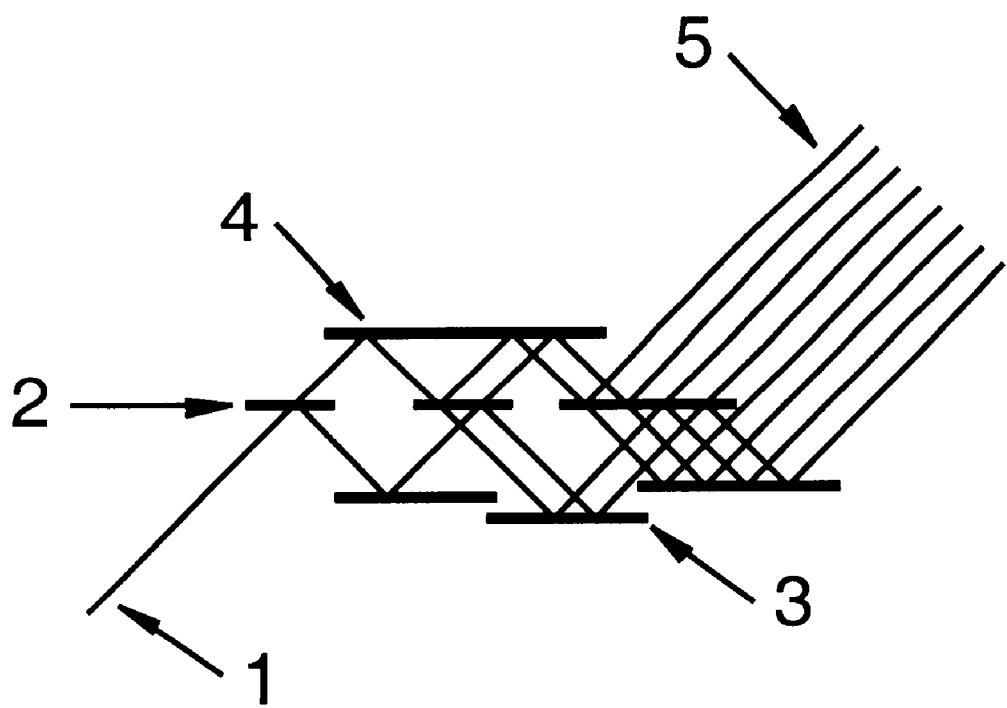
FIG. 4 shows an arrangement of several high reflectivity mirrors in a serial arrangement with several partially reflecting mirrors located between them.

The beam splitter according to FIG. 4 differs only marginally from that according to FIG. 1. Here the high reflectivity mirrors and the partially reflecting mirror have been divided into several mirrors separately arranged in a series. The result regarding the splitting of a laser beam into partial beams is however the same as according to FIG. 1.

As shown in FIG. 2, a first beam splitter device is combined with a second beam splitter device. If desired, the two beam splitter devices can be tilted about an angle of approximately 90° and are arranged in series with all the partial beams (5) of both of the beam splitter devices leaving the respective beam splitter devices in a plane and the partial beams (5) as a whole create a two-dimensional array.

As shown in FIG. 3 an objective lens of a laser scanning microscope focuses the partial beams (5) to different focal points (15) of the foci (8).

Preferably, the diameter of the partial beam (5) is changed before the beam (5) enters an objective lens of a laser scanning microscope.

| LIST OF REFERENCE CHARACTERS | |
|---|---|
| 1 | laser beam |
| 2 | partially reflecting mirror |
| 3 | high reflectivity mirror |
| 4 | high reflectivity mirror |
| 5 | partial beam |
| 6 | periscope |
| 7 | microscope objective lens |
| 8 | focal point |
| 9 | sample |
| 10 | dichroic mirror |
| 11 | tube lens |
| 12 | photodetector |

We claim:

1. A beam splitter device for a laser scanning microscope comprising a laser which produces a laser beam (1) and a partially reflecting mirror (2) for splitting said laser beam (1) into partial beams (5) which leave the device in a plane and are then directed to a sample under investigation, said partially reflecting mirror (2) having a constant transmission, and being placed between two high reflectivity mirrors (3,4), said splitter device comprising:

means for transmitting said laser beam (1) to one of said high reflectivity mirrors (4) and means for reflecting said beam (1) to the other one of said high reflectivity mirrors (3) with basically equal attenuation, means for repeatedly transmitting said beam to one of said mirrors and means for repeatedly reflecting said beam to the other one of said mirrors (3,4), said partially reflecting mirror and said high reflectivity mirrors (3,4) being arranged relative to each other to cause beams (5) reflected by said partially reflecting mirror (2) not to coincide with beams reflected by said high-reflectivity mirrors (3,4);

and said device, at the exit region of said device, having an edge of said partially reflecting mirror (2) shifted along an edge of one of said high-reflective mirrors (4) and being shifted aback an edge of the other said high-reflective mirror (3).

2. Beam splitter device in accordance with claim 1, combined with at least one additional beam splitter device and wherein said at least two beam splitter devices are arranged in series and all said beams (5) leave the beam splitter devices in a plane.

3. Beam splitter device in accordance with claim 1, combined with a second beam splitter device, and wherein said two beam splitter devices are tilted about an angle of approximately 90° and are arranged in series with all said partial beams (5) of both of said beam splitter devices whereby beams leave the respective beam splitter devices in a plane and said partial beams (5) as a whole create a two-dimensional array.

4. Beam splitter device in accordance with claim 1, wherein an objective lens of a laser scanning microscope focuses said partial beams (5) to different focal points.

5. Beam splitter device in accordance with claim 1, constructed and arranged to change the diameter of said partial beams (5) before said beams enter an objective lens of said laser scanning microscope.

6. The beam splitter of claim 1 wherein said high reflectivity mirrors (3,4) are tilted with respect to said partially reflecting mirror (2) to assist in causing said beams (5) reflected by said partially reflecting mirror (2) not to coincide with beams reflected by said high-reflectivity mirrors (3,4).

7. The beam splitter of claim 1 wherein said partially reflective mirror (2) is positioned at different distances from said high reflectivity mirrors (3,4) to assist in causing said beams (5) reflected by said partially reflecting mirror (2) not to coincide with beams reflected by said high-reflectivity mirrors (3,4).

8. A method for splitting and reflecting beams in a laser scanning microscope which produces a laser beam (1) comprising the steps of: reflecting a beam from a partially reflecting mirror (2); splitting said laser beam (1) with a splitting device into partial beams (5); causing said partial beams to travel in a plane; directing said partial beams to a sample under investigation; providing said partially reflecting mirror (2) with a constant transmission; placing said partially reflecting mirror between two high reflectivity mirrors (3,4); transmitting said laser beam (1) to one of said high reflectivity mirrors (3); reflecting said beam (1) to the other one of said high reflectivity mirrors (4) with basically equal attenuation; repeatedly transmitting said beam to one of said mirrors; and repeatedly reflecting said beam to the other one of said mirrors (4); arranging said partially reflecting mirror and said high reflectivity mirrors (3,4) relative to each other to cause beams (5) reflected by said partially reflecting mirror (2) not to coincide with beams reflected by said high-reflectivity mirrors (3,4); shifting forwardly, at an exit region of said splitting device, an edge of said partially reflecting mirror (2) along an edge of one of said high-reflective mirrors (4); and shifting rearwardly an edge of the other said high-reflective mirror (3).

9. The method of claim 8, comprising the step of providing at least one additional beam splitter device, and wherein said at least two beam splitter devices are arranged in series and all said beams (5) leave the devices in a plane.

10. The method of claim 8, comprising the step of providing at least one additional beam splitter device, tilting said two beam splitter devices about an angle of approximately 90° and arranging the beam splitter devices in series with all said partial beams (5) of both of said beam splitter devices whereby beams leave the respective beam splitter devices in a plane and said partial beams (5) as a whole create a two-dimensional array.

11. The method of claim 8, including the step of focusing, with an objective lens of a laser scanning microscope, said partial beams (5) to different focal points.

12. The method of claim 8, including the step of: changing the diameter of said partial beams (5) before said beams enter an objective lens of said laser scanning microscope.

13. The method of claim 8 including the step of tilting said high reflectivity mirrors (3,4) with respect to said partially reflecting mirror (2) to assist in causing said beams (5) reflected by said partially reflecting mirror (2) not to coincide with beams reflected by said high-reflectivity mirrors (3,4).

14. The method of claim 8 including the step of positioning said partially reflective mirror (2) at different distances from said high reflectivity mirrors (3,4) to assist in causing said beams (5) reflected by said partially reflecting mirror (2) not to coincide with beams reflected by said high-reflectivity mirrors (3,4).

* * * * *